(12) United States Patent
Gross et al.

(10) Patent No.: US 7,610,173 B2
(45) Date of Patent: Oct. 27, 2009

(54) **TECHNIQUE FOR RESOLVING "NO-TROUBLE-FOUND" (*NTF*) EVENTS IN ELECTRONIC SYSTEMS**

(75) Inventors: Kenny C. Gross, San Diego, CA (US); Keith A. Whisnant, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 20 days.

(21) Appl. No.: 11/876,446

(22) Filed: Oct. 22, 2007

(65) Prior Publication Data

US 2009/0106592 A1 Apr. 23, 2009

(51) Int. Cl.
*G06F 11/30* (2006.01)
*G21C 17/00* (2006.01)

(52) U.S. Cl. .................................... 702/183; 702/186

(58) Field of Classification Search ......... 702/182–186, 702/109, 112, 113, 117–120, 123, 124; 714/5, 714/10, 25, 40, 41, 44
See application file for complete search history.

(56) References Cited

U.S. PATENT DOCUMENTS

| | | | |
|---|---|---|---|
| 5,422,890 A * | 6/1995 | Klingsporn et al. ......... 714/723 |
| 7,171,589 B1 * | 1/2007 | Urmanov et al. .............. 714/47 |
| 7,487,058 B2 * | 2/2009 | Gross et al. ................. 702/113 |
| 2003/0216890 A1 * | 11/2003 | Gross et al. ................. 702/186 |
| 2004/0078634 A1 * | 4/2004 | Gilstrap et al. ................. 714/5 |
| 2008/0115014 A1 * | 5/2008 | Vaidyanathan et al. ........ 714/42 |
| 2008/0228462 A1 * | 9/2008 | Gross et al. ................... 703/22 |
| 2009/0106600 A1 * | 4/2009 | Gross et al. ................... 714/39 |

* cited by examiner

*Primary Examiner*—Michael P Nghiem
(74) *Attorney, Agent, or Firm*—Park, Vaughan & Fleming LLP

(57) ABSTRACT

A system that diagnoses a failure in a computer system is described. During operation, the system tests the computer system using a sequence of tests, where a given test includes a given load associated with a pre-determined failure mechanism for a given failure condition. During the given test, the system obtains results, which include telemetry signals that are monitored within the computer system. If the results indicate the given failure condition, the system ceases the testing and indicates that the computer system has the given failure condition. Otherwise, the system continues the sequence of tests until the sequence is completed, at which point, if no fault has been detected, the system indicates that a no-trouble-found (NTF) condition exists.

20 Claims, 7 Drawing Sheets

┌─ 200

┌─────────────────────────────────────────────────────────┐
│ DETERMINE IF A COMPUTER SYSTEM SUCCESSFULLY POWERS UP PRIOR TO │
│ PERFORMING A SEQUENCE OF TESTS │
│ (OPTIONAL) │
│ 210 │
└─────────────────────────────────────────────────────────┘
                              │
                              ▼
┌─────────────────────────────────────────────────────────┐
│ TEST THE COMPUTER SYSTEM USING THE SEQUENCE OF TESTS, WHERE A │
│ GIVEN TEST INCLUDES A GIVEN LOAD ASSOCIATED WITH A PRE-DETERMINED │
│ FAILURE MECHANISM FOR A GIVEN FAILURE CONDITION │
│ 212 │
└─────────────────────────────────────────────────────────┘
                              │
                              ▼
┌─────────────────────────────────────────────────────────┐
│ OBTAIN RESULTS DURING THE GIVEN TEST, WHERE THE RESULTS INCLUDE │
│ TELEMETRY SIGNALS THAT ARE MONITORED WITHIN THE COMPUTER SYSTEM │
│ 214 │
└─────────────────────────────────────────────────────────┘
                              │
                              ▼
┌─────────────────────────────────────────────────────────┐
│ IF THE RESULTS INDICATE THE GIVEN FAILURE CONDITION, CEASE THE │
│ TESTING AND INDICATE THAT THE COMPUTER SYSTEM HAS THE GIVEN │
│ FAILURE CONDITION, AND OTHERWISE CONTINUE THE SEQUENCE OF TESTS │
│ UNTIL THE SEQUENCE IS COMPLETED, AT WHICH POINT, IF NO FAULT HAS │
│ BEEN DETECTED, INDICATE THAT A NO-TROUBLE-FOUND CONDITION EXISTS │
│ 216 │
└─────────────────────────────────────────────────────────┘

FIG. 2A

TECHNIQUE FOR RESOLVING "NO-TROUBLE-FOUND" (NTF) EVENTS IN ELECTRONIC SYSTEMS

BACKGROUND

1. Field of the Invention

The present invention relates to techniques for diagnosing the causes of anomalies within electronic systems. More specifically, the present invention relates to a technique for resolving a "no-trouble-found" (NTF) condition in electronic systems.

2. Related Art

As electronic commerce grows increasingly more prevalent, businesses are increasingly relying on electronic systems, such as computer systems, to process ever-larger volumes of electronic transactions. As a consequence, a failure in one of these computer systems can be disastrous, potentially resulting in millions of dollars of lost business. Moreover, a failure can seriously undermine consumer confidence in a business, making customers less likely to purchase goods and services from the business.

When computer systems fail, it is often due to an intermittent failure. During such failures, it is common for components, subsystems, or entire computer systems to indicate they have failed by either 'crashing' or otherwise halting processing, with or without writing failure messages to a system log file. "No-Trouble-Found" (NTF) events arise when a service engineer is dispatched to repair a failed computer system (or when the failed computer system is returned to the manufacturer) and the computer system runs normally with no indication of a problem.

NTF events can significantly increase warranty and operational expenses, including the expenses associated with: the allocation of limited engineering resources to field issues; increased repair times, and the associated reduction in repair-center throughput; increased spare-part inventories; and/or increased component scrap rates. In addition, NTF events can adversely impact customer satisfaction and loyalty. In particular, it is embarrassing when a manufacturer is unable to determine the root cause of a problem. Customers are generally happier when a root cause can be determined, because this gives the customer some assurance that the root cause has been corrected, and is therefore not likely to cause a further disruption in the customer's business.

Moreover, existing approaches for diagnosing failures in computer systems are often ad hoc. For example, they may be based on anecdotal success stories or subjective personal preference(s). Consequently, a test that previously worked well in identifying a particular failure mechanism may be used to try to diagnose a suspect computer system, which may have a different failure mechanism. Hence, this approach may be unable to induce a failure during an allotted time interval and engineers may erroneously conclude that an NTF event has occurred in the computer system.

Hence, what is needed is a technique for resolving NTF conditions in electronic systems, without the above-described problems.

SUMMARY

One embodiment of the present invention provides a system for diagnosing a failure in a computer system. During operation, the system tests the computer system using a sequence of tests, where a given test includes a given load associated with a pre-determined failure mechanism for a given failure condition. During the given test, the system obtains results, which include telemetry signals that are monitored within the computer system. If the results indicate the given failure condition, the system ceases the testing and indicates that the computer system has the given failure condition. Otherwise, the system continues the sequence of tests until the sequence is completed, at which point, if no fault has been detected, the system indicates that a no-trouble-found (NTF) condition exists.

In some embodiments, the given load includes an application. Moreover, the application may be configured to stress a portion of the computer system, such as: a processor, memory, an application-specific integrated circuit, an input/output interface, and/or a disk drive.

In some embodiments, different sequences of tests are used for different types of computer systems.

In some embodiments, the telemetry signals include information associated with thermal dynamics of the computer system. For example, the telemetry signals may include temperature samples measured at different locations in the computer system.

In some embodiments, the order of the sequence of tests is selected to increase the probability of inducing the given failure condition in a given time interval.

In some embodiments, the system determines whether the computer system successfully powers up prior to performing the sequence of tests.

In some embodiments, after determining that the computer system powers up, the sequence of tests includes one or more stress tests. Next, after the one or more stress tests, the sequence of tests may include applying one or more sinusoidal perturbations in computer-load or physical variables to the computer system to obtain a dynamic input-output characterization of the computer system in the frequency domain.

Moreover, after applying the one or more sinusoidal perturbations, the sequence of tests may include determining an effect of temperature variation in the computer system. For example, the temperature variation may be induced by varying a flow of a coolant through the computer system while the computer system is operating.

Additionally, after applying the one or more sinusoidal perturbations, the sequence of tests may include comparing a characteristic of the computer system with a pre-determined value associated with a computer-system type to which the computer system belongs. Note that the pre-determined value may be associated with the absence of the given failure condition.

Then, after applying the one or more sinusoidal perturbations and determining the effect of temperature variation in the computer system, the system may analyze telemetry signals obtained during these tests to determine one or more frequencies in the frequency domain that are associated with one or more temperature signals. Note that the presence of the given failure condition may be determined based on the one or more frequencies.

Next, after analyzing the telemetry signals, the sequence of tests may include characterizing vibrations of the computer system based on vibrations internal to the computer system. These vibrations may be inferred from throughput to one or more disk drives in the computer system.

Another embodiment provides a method including at least some of the above-described operations.

Another embodiment provides a computer program product for use in conjunction with the system.

BRIEF DESCRIPTION OF THE FIGURES

FIG. 2A is a flow chart illustrating a process for diagnosing a failure in a computer system in accordance with an embodiment of the present invention.

Note that like reference numerals refer to corresponding parts throughout the drawings.

DETAILED DESCRIPTION

Figure 1:
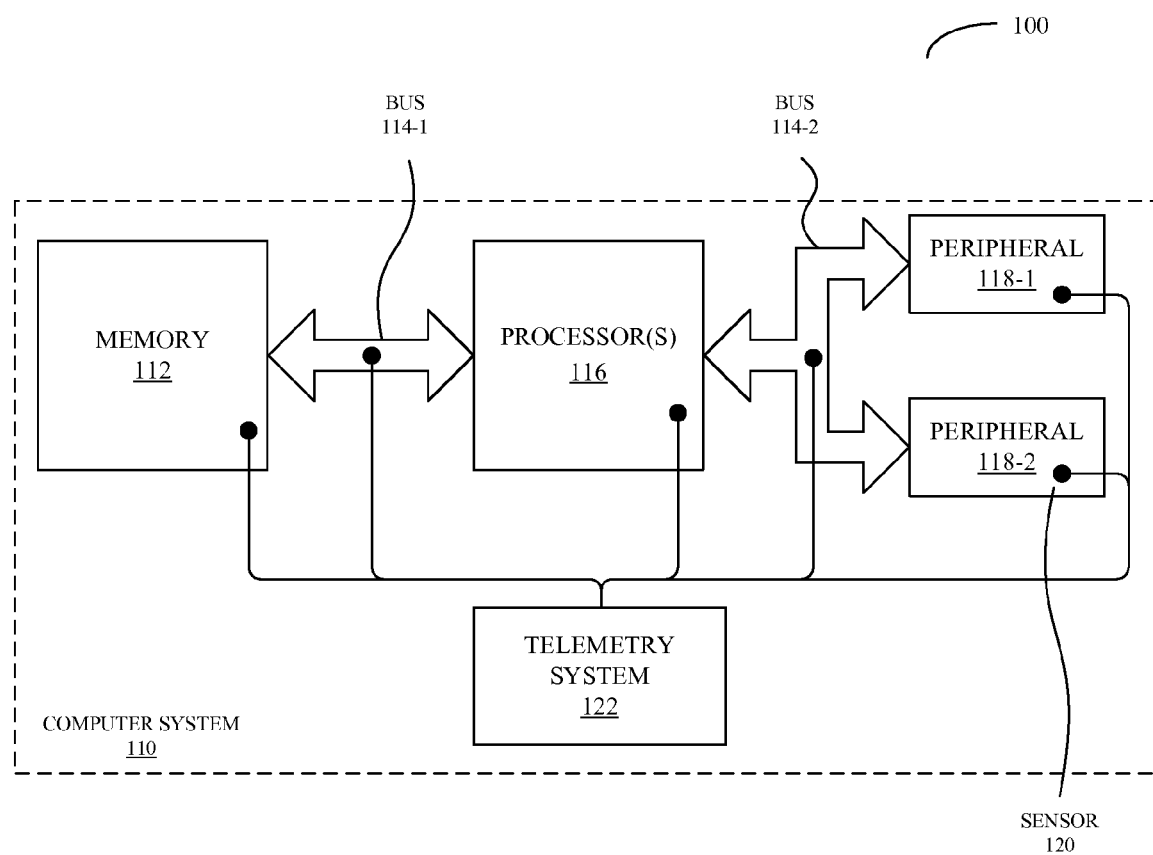
FIG. 1 is a block diagram illustrating a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system, a method, and a computer program product (i.e., software) for use with the system are described. These systems and processes may be used to diagnose a failure in a computer system. In particular, these techniques may be used to determine whether or not a "no-trouble-found" (NTF) conditions exists.

In some embodiments, a sequence of tests is performed on the computer system. These tests, and the rich telemetry data that is simultaneously collected in the computer system, facilitate systematic diagnosis of one or more failure(s) in the computer system. Moreover, the order of the tests is selected to increase a probability of inducing these failure(s) during a given time interval, thereby reducing the likelihood of misdiagnosing the computer system as having an NTF event or condition. Consequently, the sequence of tests may reduce the number of NTF events and may, therefore, lead to improved reliability and reduced warranty and operating expenses associated with the computer system.

While diagnosis of failures in computer systems is used an illustrative example in the discussion that follows, note that these techniques may be used to diagnose failures in a wide variety of electronic devices and systems, including: servers, laptop computers, personal computers, work stations, mainframe computers, a digital signal processor, a portable-computing device, a personal organizer, a device controller, a computational engine within an appliance, a device or system that includes one or more processors or processor cores, hand-held or portable devices (such as personal digital assistants and/or cellular telephones), set-top boxes, home networks, and/or video-game devices.

Note that data and the results of the tests may be received and transmitted over a network, such as: the Internet or World Wide Web (WWW), an Intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a system, a method, and software for diagnosing a failure in the computer system. Some fraction of computer systems returned from the field that allegedly have an NTF condition really experienced no fault condition. These 'true good' computer system and component returns can result from human errors (e.g., when a service engineer pulls the wrong board) and/or from a practice called 'shotgunning,' in which a service engineer hypothesizes the most likely cause(s) of a problem and replaces one or more components in the computer system in an effort to bring stability to a customer's assets. This latter technique is typically used when a crisis occurs at the customer's facility and there are no specific log messages or other hard evidence pointing to a true root cause of the problem.

In the discussion that follows, a technique is described that facilitates the identification of the 'true good' computer systems, and distinguishes these 'true good' computer systems from returns that have an actual NTF condition. Note that NTF conditions can result from a variety of degradation mechanisms, including: transient/intermittent faults; threshold limits on noisy physical variables; vibration-accelerated degradation modes; and/or sensor degradation events. Consequently, the sequence of tests (which is described further below with reference to FIGS. 2A and 2B) is used to systematically test the computer system for these degradation mechanisms, thereby facilitating diagnosis of the underlying problem, and reducing or eliminating the possibility of mislabeling a failure as an NTF condition.

Nonetheless, it is often very difficult to detect these degradation mechanisms based solely on the outputs from the tests, which typically indicate whether or not a failure has occurred. To improve the overall diagnostic capability, system-telemetry signals or data is also collected during the computer system during several of the tests. Monitoring of system-telemetry data is shown in FIG. 1, which illustrates an embodiment 100 of an example computer system 110. Computer system 110 includes processor(s) (or processor cores) 116, memory 112, and peripherals 118. Note that processor(s) 116 can be any type of processor(s) that executes program code.

Memory 112 contains data and program code for processor(s) 116 and is coupled to processor(s) 116 through bus 114-1, which provides a communication channel between processor(s) 116 and memory 112. Moreover, peripherals 118 can be any type of peripheral components, such as video cards, interface cards, or network cards. Note that bus 114-2 provides a communication channel between processor(s) 116 and peripherals 118.

Although we use computer system 110 for the purposes of illustration, embodiments of system-telemetry monitoring can be applied to other systems, such as: desktop computers, workstations, embedded computer systems, laptop computer systems, servers, networking components, peripheral cards, handheld computing devices, automated manufacturing systems, and many other electronic systems. Moreover, embodiments of the system-telemetry monitoring can be applied to: individual chips, components comprised of multiple chips, field-replaceable units (FRUs), and/or entire systems.

In some embodiments, computer system 110 includes telemetry system 122. This telemetry system is coupled through a telemetry harness to a number of sensors, such as sensor 120, on components in computer system 110. Telemetry system 122 uses the sensors to sample system performance metrics, which can then be used to determine the performance of the associated components and/or the computer system 110. For example, telemetry system 122 can sample physical system performance metrics, such as: temperatures, relative humidity, cumulative or differential vibrations, fan speed, acoustic signals, currents, voltages, time-domain reflectometry readings, and/or miscellaneous environmental variables. In some embodiments, the sensors, such as temperature sensors, are sampled or measured at pre-determined time intervals.

Moreover, telemetry system 122 can separately or additionally use software sensors to sample software-system performance metrics, such as: system throughput, transaction latencies, queue lengths, load on the processor(s) 116, load on the memory 112, load on the cache, I/O traffic, bus saturation metrics, FIFO overflow statistics, and/or various other system performance metrics gathered from software.

In some embodiments, telemetry system 122 is implemented entirely in software and entails no hardware modifications to the computer system 110. Consequently, telemetry system 122 may be installed on the computer system 110 after it has been received at a repair center.

Note that in some embodiments computer system 110 includes fewer or additional components. Moreover, two or more components may be combined into a single component and/or a position of one or more components may be changed.

We now describe embodiments of the sequence of tests. As noted previously, in conjunction with the system-telemetry data, the results of these tests provide rich signatures that accelerate, amplify, and otherwise expose the degradation mechanisms most likely to cause NTF conditions in computer systems. While this technique may not eliminate all NTF conditions, it can significantly reduce NTF incidence. Moreover, after performing the sequence of tests, the manufacturer of the computer system will have confidence that components that have been incorrectly returned from the field (for example, due to human error) are really 'good as new' and can be returned to stock.

FIG. 2A presents a flow chart illustrating an embodiment of a process 200 for diagnosing a failure in a computer system, which may be performed by a system (such as a sequential exerciser controller, which is described further below with reference to FIG. 3A). During operation, the system optionally determines if the computer system successfully powers up prior to performing the sequence of tests (210). Next, the system tests the computer system using the sequence of tests (212), where a given test includes a given load associated with a pre-determined failure mechanism for a given failure condition. Note that the given load may include an application, which may be configured to stress a portion of the computer system, such as: a processor, memory, an application-specific integrated circuit, an input/output interface, and/or a disk drive.

During the given test, the system obtains results, which include telemetry signals that are monitored within the computer system (214). If the results indicate the given failure condition, the system ceases the testing and indicates that the computer system has the given failure condition (216). Otherwise, the system continues the sequence of tests until the sequence is completed, at which point, if no fault has been detected, the system indicates that a no-trouble-found (NTF) condition exists (216).

Figure 2B:
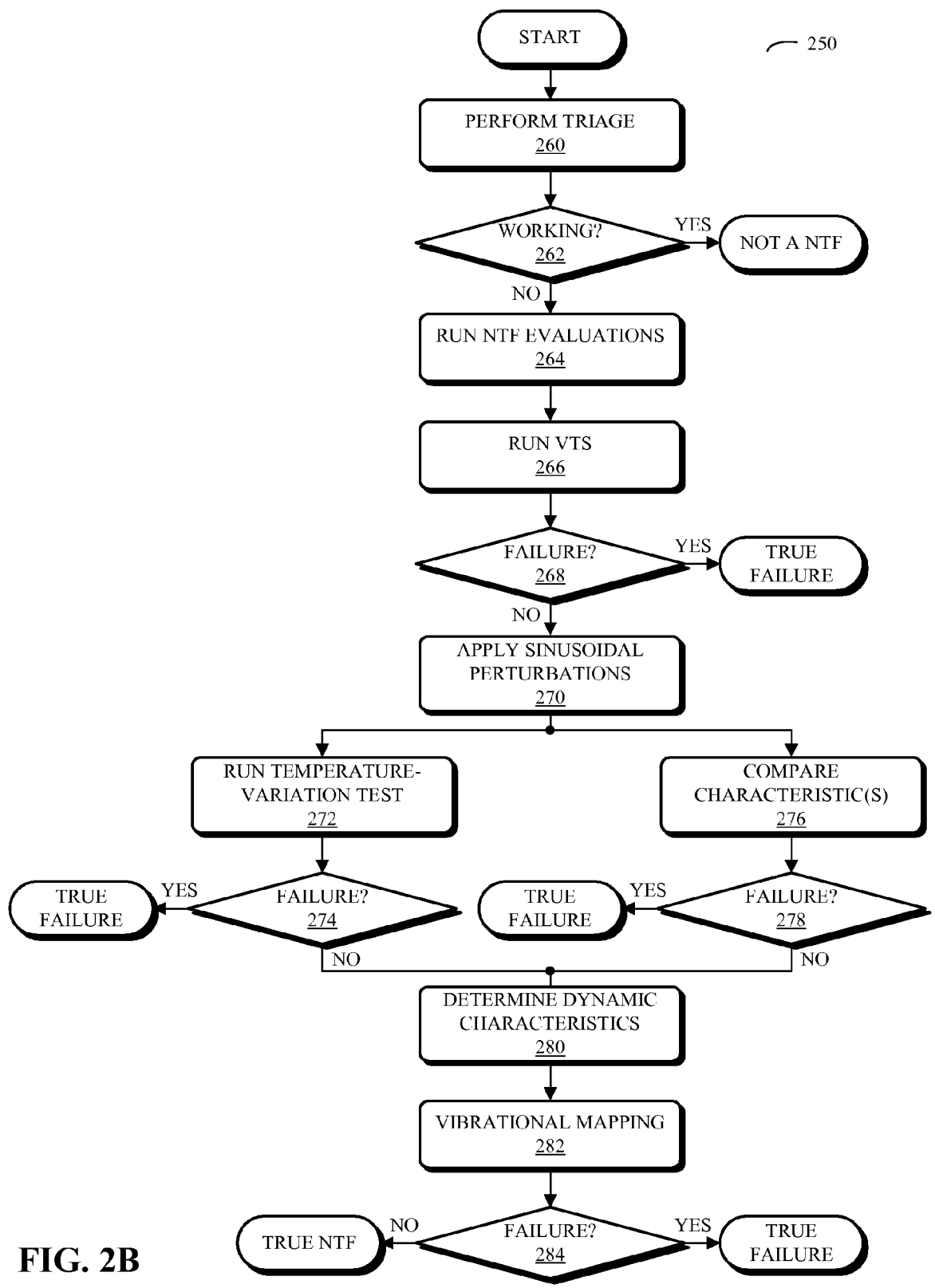
FIG. 2B is a flow chart illustrating a process for diagnosing a failure in a computer system in accordance with an embodiment of the present invention.
Figure 3A:
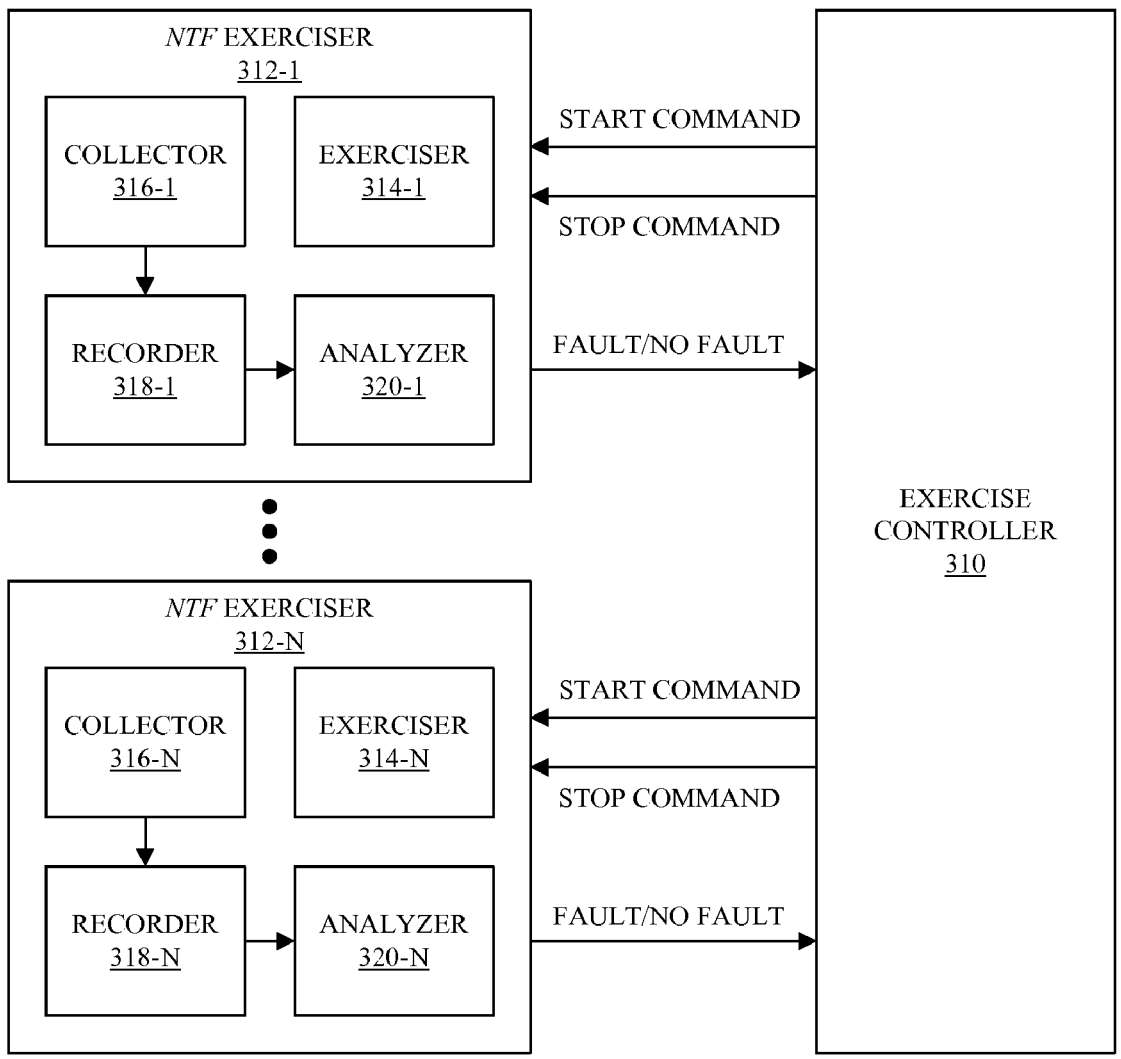
FIG. 3A is a block diagram illustrating a system in accordance with an embodiment of the present invention.

FIG. 2B presents a flow chart illustrating an embodiment of a process 250 for diagnosing a failure in a computer system, which may be performed by a system (such as a sequential exerciser controller, which is described further below with reference to FIG. 3A). During operation, the system performs basic triage (260) on the computer system which is returned from the field. This may include determining if the computer system powers up and/or is working normally. If the computer system is working (262) then the computer system does not have an NTF condition.

However, if the computer system is not working (262), the system may perform a series of NTF evaluations (264), which look for known conditions associated with an NTF event. Next, the system may execute one or more stress tests in a group of stress tests (266), such as those provided in a Validation Test Suite. During the one or more stress tests, system-telemetry data may be monitored in the computer system, as described previously in FIG. 1. For example, the system-telemetry data may include information associated with thermal dynamics of the computer system, such as temperature samples measured at different locations in the computer system. Note that degradation of one or more signals in the system-telemetry data may indicate a failure in the computer system.

Typically, the output from a given stress tests indicates whether or not a failure has occurred in the computer system. If a failure has occurred (268) then the computer system has a true failure, i.e., the computer system does not have an NTF condition. However, if a failure has not occurred (268), additional stress tests may be performed until either a failure occurs or all of the stress tests in the group of stress tests have been performed.

If a failure does not occur, the system may apply one or more sinusoidal perturbations (270) in computer-load or physical variables to the computer system to obtain a dynamic input-output characterization of the computer system in the frequency domain. In some embodiments, a temporal series of sinusoidal perturbations, which may include multiple frequencies, are applied to one or more nodes in the computer system. The resulting frequency-domain information can be used to identify potential failures, even when they are still below a failure threshold.

Subsequently, the system may perform a temperature-variation test (272) to determine an effect of temperature variation in the computer system, which is sometimes referred to as a 'thermal nudge test.' This test is useful because thermal stress, e.g., a time-varying thermal history, is often useful in accelerating degradation mechanisms. In particular, small temperature fluctuations (for example, 2-10 C with a period of 5 minutes to one hour) and/or gradients can accelerate a class of degradation mechanisms associated with NTF events, such as: interconnect problems, delamination of bonded components, stress relaxation in metallized-particle interconnect elastomeric pin connectors, and intermittent sensor problems. Moreover, such gradients and cycles may be more effective in this regard than absolute temperature changes.

Note that in some embodiments the temperature variation is induced by varying a flow of a coolant through the computer system while the computer system is operating. For example, cooling fans can be controlled by: controlling adjustable louvers that restrict airflow through the computer system; changing a fan speed; and/or if the fans only have one speed, by cycling the fans on and off. Alternatively, in embodiments where a liquid coolant (instead of air) is pumped through the computer system, the system may vary the flow of the coolant by varying the speed of a coolant pump that pumps the coolant through the computer system. In some embodiments, the coolant-flow adjustments may be based on system-telemetry data (for example, in a control loop), thereby allowing a desired temperature variation to be produced more accurately.

In an exemplary embodiment, the temperature-variation test or exerciser is a system control script that generates a sequential perturbation in a flow of coolant in such a manner as to create small-amplitude standing wave variations in temperature throughout the inside of the computer system. Moreover, at any given point within the computer system, the temperature perturbations may be approximately sinusoidal in time.

This temperature-variation test simultaneously achieves two objectives that substantially elevate the probability of identifying spurious or intermittent sources of NTF events. (1) It induces small-amplitude temperature variations that are small enough to avoid introducing effects deleterious to the long-term reliability of the computer system, but create larger amplitudes, gradients and cycle frequencies than would be observed if the computer system were simply operating in a typical customer environment. (2) The induced temperature variations are periodic with time which enables sophisticated analysis techniques to be used to compute highly accurate quantitative diagnostic metrics that are impossible to obtain from typical ambient-temperature operation of computer systems. Diagnostic metrics that are enabled by the temperature-variation test include: thermal-coupling coefficients, transfer functions, and phase (lead/lag) relationships between and among the numerous system board components that are instrumented with temperature sensors throughout computer systems, such as high-end servers.

Additionally or separately to the temperature-variation test, the system may compare one or more characteristics of the computer system (276) with one or more pre-determined values associated with a computer-system type to which the computer system belongs. Note that the pre-determined values may be associated with the presence and/or absence of the given failure condition.

In an exemplary embodiment, comparing one or more characteristics of the computer system involves using a change-detection technique, such as a Sequential Probability Ratio Test (SPRT). SPRT is an extremely sensitive binary hypothesis test that can detect very subtle changes in time series signals with: a high confidence factor, a high avoidance of 'false positives,' and a short time-to-detection. In the present technique, SPRT may be used to identify the presence or absence of a degradation mechanism or a failure mechanism that is believed to be extremely subtle and, if present, is buried in a set of dynamically interacting parameters.

Comparisons of the one or more characteristics may be made relative to the corresponding characteristics (which were previously measured or are simultaneously measured with those of the computer system) from an identical computer system, which has the same hardware configurations (i.e., system boards, I/O boards, network-interface cards, etc.) and which executes the same deterministic exerciser load(s), and which does not exhibit an NTF condition (this computer system is henceforth referred to as the 'golden system'). In particular, pairwise combinations of corresponding characteristics or signals from the computer system and the golden system may be input into a large SPRT manifold that differences the corresponding signals and applies a 'Wald test' to a cumulative sum of the differenced values. For all signals that exhibit dynamic patterns that are identical (in the statistical sense) between the golden system and the computer system, the corresponding SPRT tests will continuously return 'OK' decisions. However, any anomaly between the golden system and the computer system variables will trigger an alarm. Moreover, because of the 'Wald criteria' that is used for designing the SPRT output, this test will have the shortest possible sampling time for making a decision with a given (pre-specified) level of confidence.

If a failure occurs during the temperature-variation test (274) and/or during the comparison of the one or more characteristics (278) then the computer system has a true failure, i.e., the computer system does not have an NTF condition. However, if a failure has not occurred in either of these tests (274, 278), the system may analyze system-telemetry data obtained during these tests to determine one or more frequencies in the frequency domain that are associated with one or more temperature signals. In particular, the system may determine dynamic system characteristics (280) based on system-telemetry data from the sinusoidal perturbations and/or the temperature-variation test to look for peaks in the frequency domain. Note that the presence of the given failure condition may be determined based on the frequency locations of one or more peaks. For example, if a peak is not at the correct frequency, there may be a failure in the computer system or in a telemetry sensor.

Next, the system characterizes vibrations of the computer system (282), in up to three dimensions, based on vibrations internal to the computer system. In some embodiments, the vibrations are inferred from throughput to one or more disk drives in the computer system. If a failure occurs during the vibrational characterization (284) then the computer system has a failure, i.e., the computer system does not have an NTF condition. However, if a failure has not occurred (284) then computer system has a true NTF condition.

Note that in some embodiments of processes 200 (FIG. 2A) and/or 250 there may be additional or fewer operations. For example, in some embodiments different sequences of tests are used when diagnosing different types of computer systems. In some embodiments, the sequence of tests may include: a threshold limit test on one or more performance parameters, an automated data mining and pattern recognition agent, a soft error rate discriminator (SERD), a multi-variate state estimation technique (MSET), and/or a signature analysis mechanism for intrusion detection.

Moreover, the order of the operations may be changed, and two or more operations may be combined into a single operation. Note that the various tests in the sequence of tests may be performed without modifying hardware in the computer system, for example, by installing an executing one or more program modules or sets of instructions in the computer system.

Execution and analysis of tests or exercisers in the sequence of tests may be overseen by a system controller. This is shown in FIG. 3A, which presents a block diagram illustrating an embodiment of a system 300. This system may include an exerciser controller 310 which controls the execution of a sequence of NTF exercisers 312 (including start and stop commands), which may be implemented in hardware and/or software, and which may be either internal to and/or external to the computer system. In an exemplary embodiment the NTF exercisers 312 are implemented in software in the computer system.

Note that each of the NTF exercisers 312, such as NTF exerciser 312-1, includes: an exerciser 314-1; a collector 316-1 to collect data (which may include system-telemetry data); a recorder 318-1 or performance monitor to store the collected data; and/or an analyzer 320-1 to analyze the collected data and to emit a 'fault' or 'no fault' message when the NTF exerciser 312-1 has completed the test or exercise.

Figure 3B:
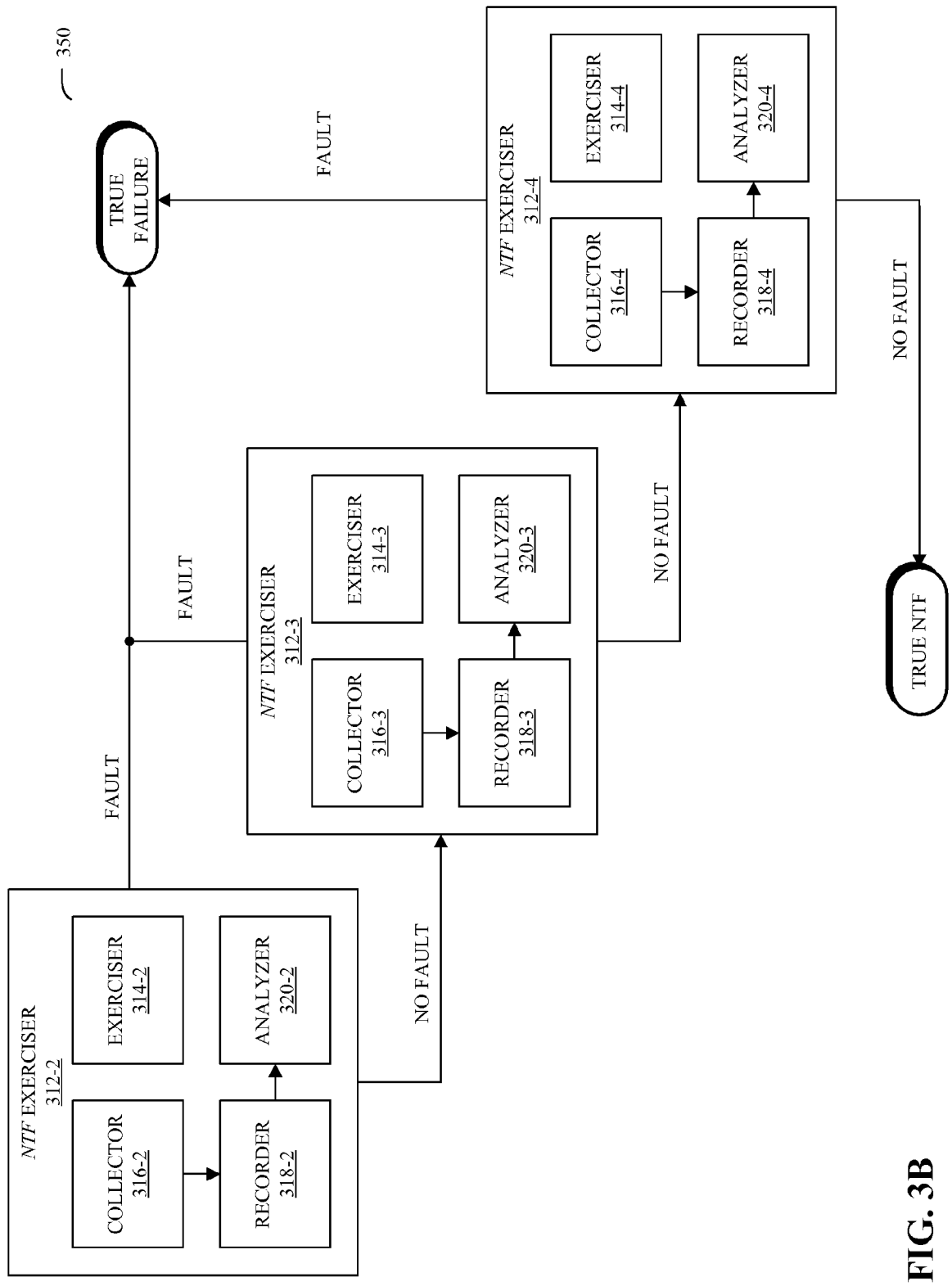
FIG. 3B is a block diagram illustrating the operation of a system in accordance with an embodiment of the present invention.

FIG. 3B presents a block diagram illustrating an embodiment of operating a system 350. In particular, during operation, system 350 sequentially executes NTF exercisers 312. If no fault occurs during a given NTF exerciser then next NTF exerciser in the sequence is performed. Moreover, if no fault has been detected after the last NTF exerciser 312 has executed then the computer system has a true NTF condition. However, if a fault occurs during any of the NTF exercisers 312 then the computer system has a true failure, i.e., it does not have an NTF condition.

Note that in some embodiments computer systems 300 (FIG. 3A) and/or 350 includes fewer or additional components. Moreover, two or more components may be combined into a single component and/or a position of one or more components may be changed. While systems 300 (FIG. 3A) and 350 (FIG. 3B) are illustrated with NTF exercisers 312, exercise controller 310 (FIG. 3A) and the technique for operating the system 350 may be used to perform other tests in the sequence of tests.

Figure 4:
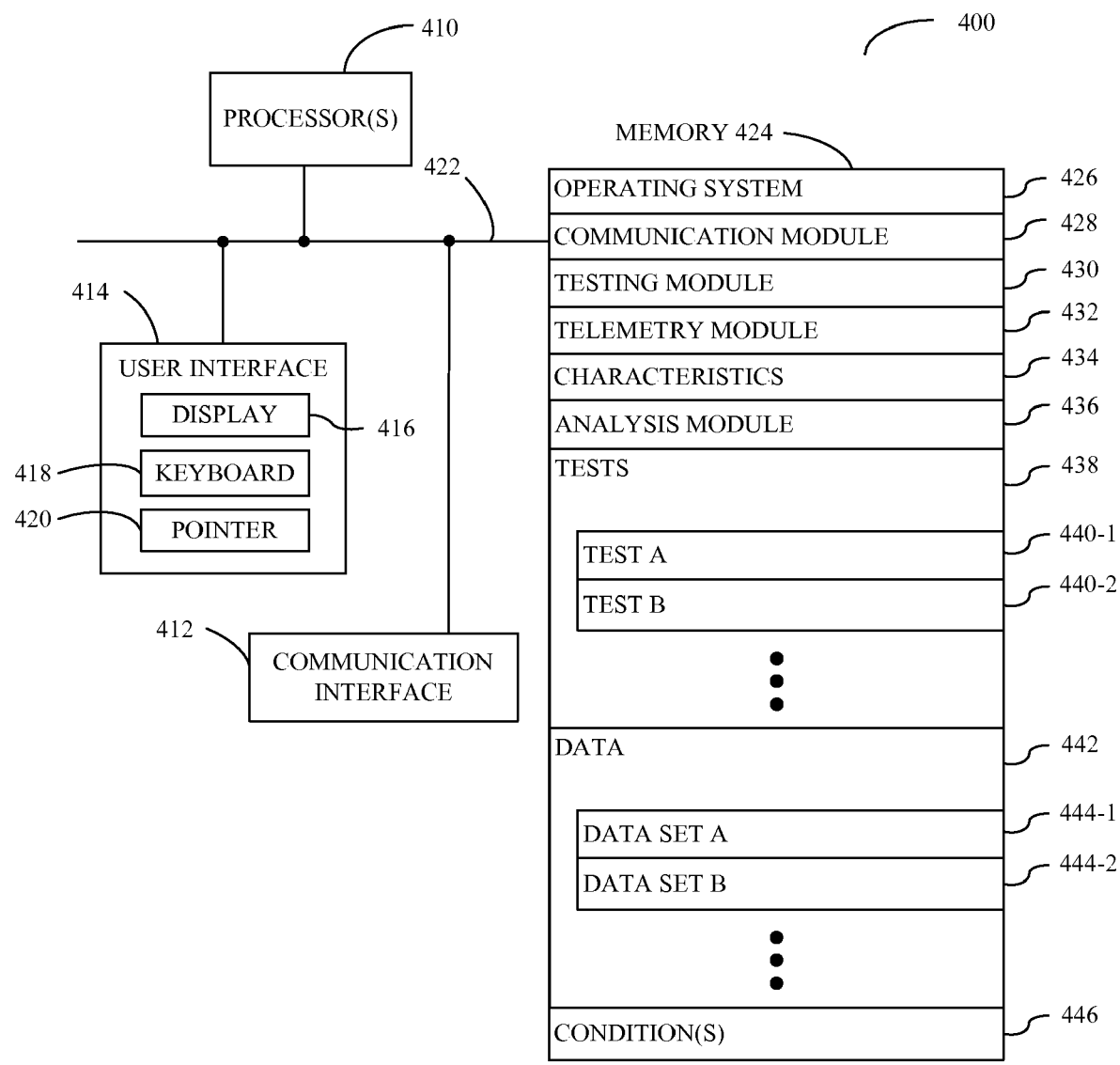
FIG. 4 is a block diagram illustrating a computer system in accordance with an embodiment of the present invention.

We now describe embodiments of a computer system that can implement one or more of the aforementioned processes. FIG. 4 presents a block diagram illustrating an embodiment of computer system 400, such as the system used to control or perform the sequence of tests. Computer system 400 includes: one or more processors (or processor cores) 410, a communication interface 412, a user interface 414, and/or one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including testing module 430 (or a set of instructions), telemetry module 432 (or a set of instructions), and/or analysis module 436 (or a set of instructions). Testing module 430 may instruct the computer system to perform a sequence of tests 438, such as test A 440-1 and/or test B 440-2. Note that one of more of the tests 438 may include comparisons with pre-determined characteristics 434 associated with the presence and/or absence of a given failure condition.

During the testing, telemetry module 432 may collect telemetry data 442, such as temperature as a function of time, from sensors in the computer system. Moreover, analysis module 436 may analyze data sets, such as data set A 446-1 and/or data set B 446-2, in the telemetry data 442 in conjunction with results of the tests 438, such as the presence or absence of one or more failure conditions 446, to diagnose the computer system.

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processors 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components. Moreover, two or more components may be combined into a single component and/or a position of one or more components may be changed. In some embodiments, the functionality of computer system 400 may be implemented more in hardware and less in software, or less in hardware and more in software, as is known in the art.

Figure 5:
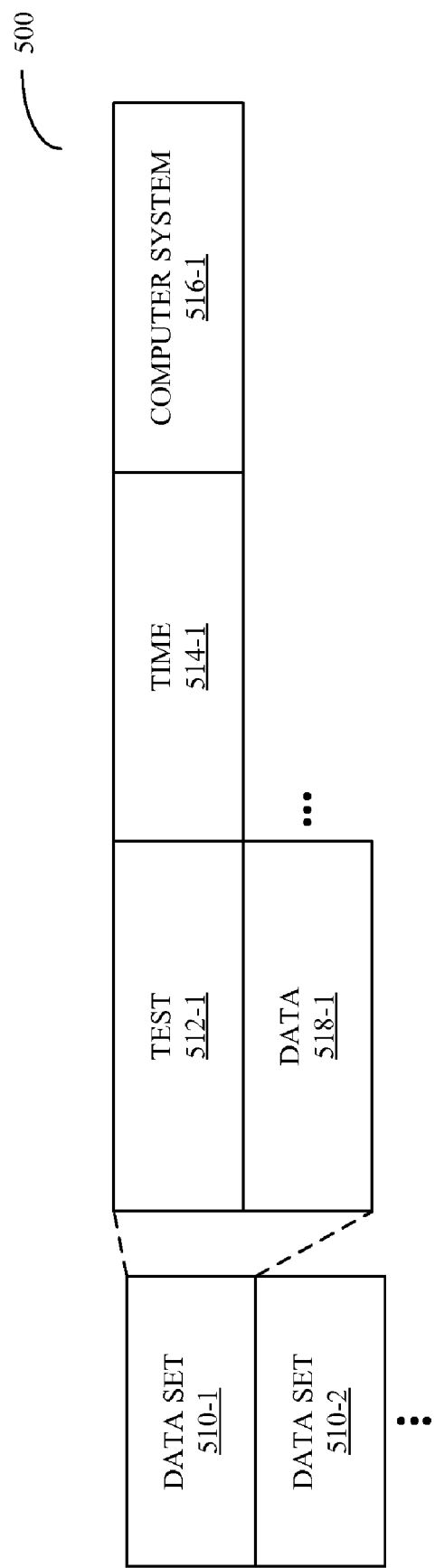
FIG. 5 is a block diagram illustrating a data structure in accordance with an embodiment of the present invention.

We now discuss data structures that may be used in the computer systems 100 (FIG. 1), the system 300 (FIG. 3A), the system 350 (FIG. 3B), and/or 400 (FIG. 4). FIG. 5 presents a block diagram illustrating an embodiment of a data structure. This data structure may include data sets 510. More specifically, a given instance of the data sets 510, such as data set 510-1, may include: an associated test 512-1; a time 514-1 when the test 512-1 was performed; a computer system 516-1 on which the test 512-1 was performed; and/or data 518-1 obtained during the test 512-1.

Note that that in some embodiments of data structure 500 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for diagnosing a failure in a computer system, comprising:

testing the computer system using a sequence of tests, wherein a given test includes a given load associated with a pre-determined failure mechanism for a given failure condition;

obtaining results during the given test, wherein the results include telemetry signals that are monitored within the computer system; and if the results indicate the given failure condition, ceasing the testing and indicating that the computer system has the given failure condition, and otherwise continuing the sequence of tests until the sequence is completed, at which point, if no fault has been detected, indicating that a no-trouble-found (NTF) condition exists;

wherein the sequence of tests includes one or more stress tests, and wherein after the one or more stress tests, the method further comprises applying one or more sinusoidal perturbations in computer-load or physical variables to the computer system to obtain a dynamic input-output characterization of the computer system in the frequency domain.

2. The method of claim 1, wherein the given load includes an application.

3. The method of claim 2, wherein the application is configured to stress a portion of the computer system.

4. The method of claim 3, wherein the portion of the computer system includes one or more of the following: a processor, memory, an application-specific integrated circuit, an input/output interface, or a disk drive.

5. The method of claim 1, wherein different sequences of tests are used for different types of computer systems.

6. The method of claim 1, wherein the telemetry signals include information associated with thermal dynamics of the computer system.

7. The method of claim 1, wherein the telemetry signals include temperature samples measured at different locations in the computer system.

8. The method of claim 1, wherein an order of the sequence of tests is selected to increase a probability of inducing the given failure condition in a given time interval.

9. The method of claim 1, further comprising determining if the computer system successfully powers up prior to performing the sequence of tests.

10. The method of claim 9, wherein, after determining that the computer system powers up, the sequence of tests includes one or more stress tests.

11. The method of claim 10, wherein, after the one or more stress tests, the sequence of tests includes applying the one or more sinusoidal perturbations in computer-load or physical variables to the computer system.

12. The method of claim 11, wherein, after applying the one or more sinusoidal perturbations, the sequence of tests includes determining an effect of temperature variation in the computer system.

13. The method of claim 12, wherein the temperature variation is induced by varying a flow of a coolant through the computer system while the computer system is operating.

14. The method of claim 12, wherein, after applying the one or more sinusoidal perturbations, the sequence of tests includes comparing a characteristic of the computer system with a pre-determined value associated with a computer-system type to which the computer system belongs; and
wherein the pre-determined value is associated with the absence of the given failure condition.

15. The method of claim 14, wherein, after applying the one or more sinusoidal perturbations and determining the effect of temperature variation in the computer system, the method further includes analyzing telemetry signals obtained during these tests to determine one or more frequencies in the frequency domain that are associated with one or more temperature signals.

16. The method of claim 15, wherein the presence of the given failure condition is determined based on the one or more frequencies.

17. The method of claim 15, wherein, after analyzing the telemetry signals, the sequence of tests includes characterizing vibrations of the computer system based on vibrations internal to the computer system.

18. The method of claim 17, wherein the vibrations are inferred from throughput to one or more disk drives in the computer system.

19. A computer-program product for use in conjunction with a computer system, the computer program product comprising a computer-readable storage medium and a computer-program mechanism embedded therein for diagnosing a failure in a computer system, the computer-program mechanism including:

instructions for testing the computer system using a sequence of tests, wherein a given test includes a given load associated with a pre-determined failure mechanism for a given failure condition;

instructions for obtaining results during the given test, wherein the results include telemetry signals that are monitored within the computer system; and if the results indicate the given failure condition, instructions for ceasing the testing and indicating that the computer system has the given failure condition, and otherwise instructions for continuing the sequence of tests until the sequence is completed, at which point, if no fault has been detected, instructions for indicating that a no-trouble-found (NTF) condition exists;

wherein the sequence of tests includes one or more stress tests, and wherein the instructions for testing the computer system include instructions for applying, after the one or more stress tests, one or more sinusoidal perturbations in computer-load or physical variables to the computer system to obtain a dynamic input-output characterization of the computer system in the frequency domain.

20. An apparatus, comprising:

a processor;

memory; and a program module, wherein the program module is stored in the memory and configured to be executed by the processor, the program module for diagnosing a failure in a computer system, wherein the program module includes:

instructions for testing the computer system using a sequence of tests, wherein a given test includes a given load that characterizes a pre-determined failure mechanism for a given failure condition;

instructions for obtaining results during the given test, wherein the results include telemetry signals that are monitored within the computer system; and if the results indicate the given failure condition, instructions for ceasing the testing and indicating that the computer system has the given failure condition, and otherwise instructions for continuing the sequence of tests until the sequence is completed, at which point, if no fault has been detected instructions for indicating that a no-trouble-found (NTF) condition exists;

wherein the sequence of tests includes one or more stress tests, and wherein the instructions for testing the computer system include instructions for applying, after the one or more stress tests, one or more sinusoidal perturbations in computer-load or physical variables to the computer system to obtain a dynamic input-output characterization of the computer system in the frequency domain.

* * * * *